US006731857B2

(12) United States Patent
Shelnut et al.

(10) Patent No.: US 6,731,857 B2
(45) Date of Patent: May 4, 2004

(54) PHOTODEFINABLE COMPOSITION, METHOD OF MANUFACTURING AN OPTICAL WAVEGUIDE WITH THE PHOTODEFINABLE COMPOSITION, AND OPTICAL WAVEGUIDE FORMED THEREFROM

(75) Inventors: James G. Shelnut, Northboro, MA (US); Matthew L. Moynihan, Sterling, MA (US)

(73) Assignee: Shipley Company, L.L.C., Marlborough, MA (US)

( * ) Notice: Subject to any disclaimer, the term of this patent is extended or adjusted under 35 U.S.C. 154(b) by 330 days.

(21) Appl. No.: 09/821,527

(22) Filed: Mar. 29, 2001

(65) Prior Publication Data

US 2002/0172492 A1 Nov. 21, 2002

(51) Int. Cl.$^7$ .................................................. G02B 6/00
(52) U.S. Cl. ....................................... 385/143; 385/141
(58) Field of Search .................................. 385/141–145

(56) References Cited

U.S. PATENT DOCUMENTS

| | | | |
|---|---|---|---|
| 5,200,487 A | 4/1993 | Lagarde et al. |
| 5,378,585 A | 1/1995 | Watanabe |
| 5,554,465 A | 9/1996 | Watanabe |
| 5,612,170 A | 3/1997 | Takemura et al. |
| 5,672,672 A | 9/1997 | Amano et al. |
| 6,054,253 A | 4/2000 | Fardad et al. |
| 6,087,064 A | 7/2000 | Lin et al. |
| 6,088,492 A | 7/2000 | Kaneko et al. |
| 6,144,795 A | 11/2000 | Dawes et al. |
| 6,344,305 B1 | 2/2002 | Lin et al. |

FOREIGN PATENT DOCUMENTS

| | | | |
|---|---|---|---|
| EP | 0 543 761 A1 | 5/1993 |
| JP | 57-168246 A | 10/1982 |
| JP | 58-096654 A | 6/1983 |
| JP | 63-279245 A | 11/1988 |
| JP | 04-271306 A | 6/1992 |
| JP | 04-366958 A | 12/1992 |
| JP | 6-172533 | 6/1994 |
| JP | 6-256523 | 9/1994 |
| JP | 8-259895 | 10/1996 |
| JP | 8-304644 | 11/1996 |
| JP | 08-327842 A | 12/1996 |
| JP | 10-148729 A | 6/1998 |
| JP | 10-253845 A | 9/1998 |
| JP | 31-033039 B2 | 11/2000 |
| JP | 02003048984 | * 2/2003 |
| WO | WO 98/26315 | 6/1998 |

OTHER PUBLICATIONS

Robert G. Brault, Randall L. Kubena and Robert A. Metzger; Bilevel polysiloxane resist for ion–beam and electron–beam lithography; SPIE Vol 539 Advances in Resist Technology and Processing II (1985).

Bagley et al., "The Processing and Use of Organosilicon Polymers for Photonic Applications", Polymer Engineering and Science, vol. 29, No. 17 (Sep. 1989), pp. 1197–1199.

\* cited by examiner

*Primary Examiner*—Walter E. Snow
(74) *Attorney, Agent, or Firm*—Jonathan D. Baskin; S. Matthew Cairns

(57) ABSTRACT

Provided are photodefinable compositions. The compositions include a silsesquioxane oligomer that has polymerized units of the formula $(RSiO_{1.5})$, wherein R is selected from hydroxyphenyl or hydroxybenzy, and a photoactive component. The solubility of the silsesquioxane oligomer is altered upon exposure to actinic radiation. Also provided are methods of manufacturing optical waveguides, optical waveguides and electronic devices.

37 Claims, 1 Drawing Sheet

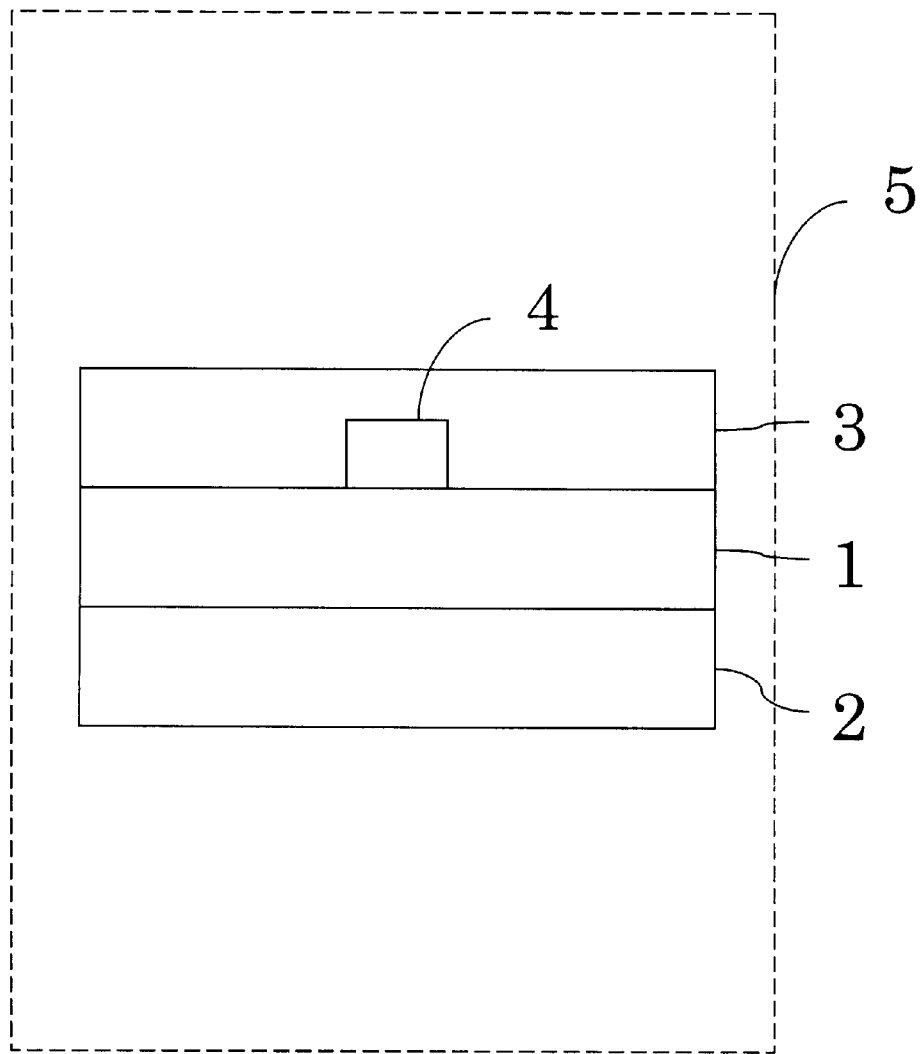
FIG.

PHOTODEFINABLE COMPOSITION, METHOD OF MANUFACTURING AN OPTICAL WAVEGUIDE WITH THE PHOTODEFINABLE COMPOSITION, AND OPTICAL WAVEGUIDE FORMED THEREFROM

BACKGROUND OF THE INVENTION

The present invention relates generally to the field of waveguides. In particular, the present invention relates to photodefinable silsesquioxane compositions that are useful as optical waveguides.

Light is becoming increasingly important in the transmission of data and communications. For example, fiber optic cables have replaced conventional electrical cables in a number of applications. Guides and switches are needed to capture, carry and distribute light carrying such transmissions.

Optical waveguides may be used individually or as an array supported on a substrate. Such waveguides typically include a core material and a cladding layer. Light propagates in the core material and is contained by the cladding layer which has a lower index of refraction than the core material. Planar optical waveguides are designed to transmit optical radiation across a two-dimensional substrate surface. This device usually performs a passive function on the optical radiation so as to modify the output signal from the input signal in a particular way. For example, splitters divide an optical signal in one waveguide into two or more waveguides. Couplers add an optical signal from two or more waveguides into a smaller number of waveguides. Spectral filters, polarizers and isolators may be incorporated into the waveguide design. Wavelength division multiplexing ("WDM") structures separate an input optical signal into spectrally discrete output waveguides, usually by employing either phase array designs or gratings. Planar optical waveguides are particularly advantageous in that they may include multiple functions on one platform.

Waveguides may also contain active functionality, i.e. where the input signal is altered by interaction with a second optical or electrical signal. Exemplary active functionality include amplification and switching such as with electro-optic, thermo-optic or acousto-optic devices.

A number of structures suitable for use as optical waveguides are known, particularly those prepared from siloxanes or silsesquioxanes. For examples, WO 97/24223 (Risen et al.) discloses the use of highly-carboxylated polysiloxanes. Such materials, when they contain methyl or vinyl side groups, can be photolytically cross-linked in the presence of a free radical photoinitiator to form insoluble siloxane films or patterns. The uncross-linked materials can then be removed with an organic solvent. The remaining cross-linked material is then thermally oxidized to form a patterned silica film which is useful as an optical waveguide.

U.S. Pat. No. 6,144,795 (Dawes et al.) discloses a method for forming planar optical waveguide cores using either a transfer printing technique or an embossing technique. Such waveguides having at least one of the core and cladding materials being an inorganic-organic hybrid including an extended matrix containing silicon and oxygen atoms with at least a fraction of the silicon atoms being directly bonded to substituted or unsubstituted hydrocarbon moieties. The hydrocarbon moieties can be either alkyl or aryl. Methyl and phenyl are the only hydrocarbon moieties specifically disclosed.

U.S. Pat. No. 6,087,064 (Lin et al.) discloses certain silsesquioxane polymers useful in photoresist compositions. The photoresist compositions include a polymer blend having 30 to 90 wt % of a silsesquioxane polymer of the formula $(R^1SiO_{1.5})_n$—$(R^2SiO_5)_m$, wherein n and m are greater than zero, $R^1$ is hydroxyphenylalkyl having at least 2 carbon atoms in the alkyl moiety and $R^2$ is selected form the group consisting of alkyl, cycloalkyl, and aryl; and 70 to 10 wt % of a non-silsesquioxane polymer. Neither waveguides nor methods of manufacturing waveguides are disclosed in this patent.

Known methods of manufacturing waveguides include 1) manually placing glass fibers into hollowed out areas on a substrate, 2) filling a mold of a desired structure with a polymeric material that is thermally cured and later removed from the mold, and 3) depositing a bulk waveguide material on a substrate, coating the bulk material with a photoresist, imaging the photoresist, and removing the undesired bulk material by etching and then removing the photoresist. Each of these processes has drawbacks, such as requiring multiple steps to define the waveguide, potential sidewall roughness issues, limited resolution and increased labor costs.

There is thus a need for methods of manufacturing waveguides that require fewer steps than conventional processes, have better resolution and less sidewall roughness.

SUMMARY OF THE INVENTION

It has been surprisingly found that waveguides can be easily prepared by the lithographic methods of the present invention. A variety of waveguide structures can be prepared by the present invention.

In one aspect, the present invention provides a photodefinable composition including a silsesquioxane oligomer including as polymerized units a monomer of the formula $(RSiO_{1.5})$ wherein R is selected from hydroxyphenyl or hydroxybenzyl; and a photoactive component, wherein the solubility of the silsesquioxane oligomer is altered upon exposure to actinic radiation.

In a second aspect, the present invention provides a method of manufacturing an optical waveguide including the steps of: a) depositing on a substrate a layer of a photodefinable composition including a silsesquioxane oligomer including as polymerized units a monomer of the formula $(RSiO_{1.5})$ wherein R is selected from hydroxyphenyl or hydroxyphenyl($C_1$–$C_5$)alkyl; and a photoactive component; and b) exposing the composition to actinic radiation to form an optical waveguide.

In a third aspect, the present invention provides an optical waveguide including a core and a cladding, wherein at least one of the core and cladding includes a silsesquioxane polymer including as polymerized units a monomer of the formula $(RSiO_{1.5})$ wherein R is selected from hydroxyphenyl or hydroxyphenyl($C_1$–$C_5$)alkyl.

In a fourth aspect, the present invention provides an electronic device including one or more waveguides including a core and a cladding, wherein at least one of the core and cladding includes a silsesquioxane polymer including as polymerized units a monomer of the formula $(RSiO_{1.5})$ wherein R is selected from hydroxyphenyl or hydroxyphenyl($C_1$–$C_5$)alkyl.

In a fifth aspect, the present invention provides a photodefinable composition including a silsesquioxane oligomer including as polymerized units a monomer of the formula $(RSiO_{1.5})$ wherein R is selected from hydroxyphenyl or hydroxybenzyl; one or more organic cross-linking agents;

and a photoactive component, wherein the solubility of the silsesquioxane oligomer is altered upon exposure to actinic radiation.

In a sixth aspect, the present invention provides a method of manufacturing an optical waveguide including the steps of: a) depositing on a substrate a layer of a photodefinable composition including a silsesquioxane oligomer including as polymerized units a monomer of the formula $(RSiO_{1.5})$ wherein R is selected from hydroxyphenyl or hydroxybenzyl; one or more cross-linking agents; and a photoactive component; and b) exposing the composition to actinic radiation to form an optical waveguide.

In a seventh aspect, the present invention provides an optical waveguide including a core and a cladding, wherein at least one of the core and cladding includes a silsesquioxane polymer including as polymerized units a monomer of the formula $(RSiO_{1.5})$ wherein R is selected from hydroxyphenyl or hydroxybenzyl; and one or more organic cross-linking agents.

In an eighth aspect, the present invention provides an electronic device including one or more waveguides including a core and a cladding, wherein at least one of the core and cladding includes a silsesquioxane polymer including as polymerized units a monomer of the formula $(RSiO_{1.5})$ wherein R is selected from hydroxyphenyl or hydroxybenzyl; and one or more organic cross-linking agents.

BRIEF DESCRIPTION OF THE DRAWINGS

FIG. 1 illustrates a waveguide and electronic device in accordance with the invention.

DETAILED DESCRIPTION OF THE INVENTION

As used throughout this specification, the following abbreviations shall have the following meanings, unless the context clearly indicates otherwise: ° C.=degrees Centigrade; wt %=percent by weight; mJ=millijoules; μm=micron=micrometer; nm=nanometer; cm=centimeter; in.=inch; N=normal; rpm=revolutions per minute; and mil= 0.001 inches.

"Oligomer" refers to dimers, trimers, tetramers and the like, and. The term "polymer" includes oligomers, dimers, trimers, tetramers and the like, and refers to both homopolymers and copolymers. The terms "cross-linker" and "cross-linking agent" are used interchangeably throughout this specification. "Resin" and "polymer" are used interchangeably throughout this specification. The term "alkyl" refers to linear, branched and cyclic alkyl. The terms "halogen" and "halo" include fluorine, chlorine, bromine, and iodine. Thus the term "halogenated" refers to fluorinated, chlorinated, brominated, and iodinated. "Fluoroalkyl" refers to both partially fluorinated and perfluorinated alkyl.

All amounts are percent by weight and all ratios are by weight, unless otherwise noted. All numerical ranges are inclusive and combinable in any order, except where it is obvious that such numerical ranges are constrained to add up to 100%.

The present invention provides a photodefinable composition including a silsesquioxane oligomer including as polymerized units a monomer of the formula $(RSiO_{1.5})$ wherein R is selected from hydroxyphenyl or hydroxybenzyl; and a photoactive component, wherein the solubility of the silsesquioxane oligomer is altered upon exposure to actinic radiation. The organic moieties on the silsesquioxane oligomers contain one or more hydroxyl groups capable of undergoing cross-linking reactions. Such photodefinable compositions are negative acting. It is preferred that the organic moiety is hydroxybenzyl.

It will be appreciated by those skilled in the art that the silsesquioxane oligomer may be a homo-oligomer, i.e. contain only one monomer, or may be a co-oligomer, i.e. contain two or more monomers. When only one monomer is used, the present silsesquioxane oligomers have the general formula $(R^1SiO_{1.5})_n$ wherein $R^1$ is hydroxyphenyl or hydroxybenzyl and n is greater than zero. When more than one silsesquioxane monomer is used, at least one silsesquioxane monomer includes hydroxyphenyl or hydroxybenzyl, and more preferably hydroxybenzyl, as the organic moiety. It is farther preferred that when more than one monomer is used that such second monomer has the general formula $(R^2SiO_{1.5})_m$ wherein $R^2$ is hydroxyphenyl, hydroxyphenyl $(C_1-C_5)$alkyl, phenyl, halophenyl, $(C_1-C_{10})$alkylphenyl, $(C_1-C_{10})$fluoroalkylphenyl, $(C_1-C_{10})$alkyl or $(C_1-C_{10})$fluoroalkyl, and wherein m are greater than zero. Such $R^2$ groups may be optionally substituted. By "substituted" means that one or more hydrogens on the alkyl and/or phenyl groups is replaced by another substituent group, such as hydroxyl, $(C_1-C_{10})$alkoxy, $(C_1-C_{10})$alkylcarbonyl, $(C_1-C_{10})$alkoxycarbonyl, $(C_1-C_{10})$alkylcarbonyloxy, and the like. Thus, particularly suitable silsesquioxane oligomers including more than one silsesquioxane monomer are those including $(R^1SiO_{1.5})_n(R^2SiO_{1.5})_m$ wherein $R^1$, $R^2$, n and m are as defined above. When more than one silsesquioxane monomer are used, it is preferred that at least one organic moiety be selected from hydroxybenzyl or hydroxyphenylethyl. It will be further appreciated that three or more silsesquioxane monomer may be present in the silsesquioxane oligomers of the invention.

In an alternate embodiment, blends of a silsesquioxane oligomer having the general formula $(R^1SiO_{1.5})_n$ wherein $R^1$ is hydroxyphenyl or hydroxybenzyl and n is greater than zero with one or more other oligomers may be suitably employed. Such other oligomers may be silsesquioxane oligomers, such as those including the formula $(R^2SiO_{1.5})_m$ wherein $R^2$ is hydroxyphenyl, hydroxyphenyl$(C_1-C_5)$alkyl, phenyl, halophenyl, $(C_1-C_{10})$alkylphenyl, $(C_1-C_{10})$fluoroalkylphenyl, $(C_1-C_{10})$alkyl or $(C_1-C_{10})$fluoroalkyl, and wherein m are greater than zero, or siloxane oligomers, or organic (non-silicon conatining) oligomers.

The hydroxyphenyl and hydroxyphenyl$(C_1-C_5)$alkyl moieties in the silsesquioxanes of the present invention contain at least one hydroxyl group, and may contain two, three or more hydroxy groups. Such hydroxyphenyl and hydroxyphenyl$(C_1-C_5)$alkyl moieties may be further substituted. By "substituted hydroxyphenyl" it is meant that one or more of the phenyl hydrogens is replaced by another substituent group. Likewise, by "substituted hydroxyphenyl $(C_1-C_5)$alkyl" is meant that one or more hydrogens of the phenyl and/or alkyl group is replaced by another substituent group. Suitable substituent groups include deuterium, halogen, preferably fluorine, $(C_1-C_6)$alkyl, $(C_1-C_6)$ haloalkyl, and the like. In one embodiment, the silsesquioxane oligomers of the present invention are preferably free of acid containing groups, such as carboxylic acid and sulfonic acid groups. In other embodiments, such acid containing groups may be desirable.

In the above formulae, n and m are the number of repeat units in the silsesquioxane oligomer. The present silsesquioxane oligomers may contain a wide range of repeat units. Thus, n and m may vary across a wide range such as from 1 to 100,000. Preferably, n and m are independently from 1 to 50,000, more preferably from 3 to 10,000, and still more preferably from 3 to 1000. Thus, the silsesquioxane oligomer may vary widely in molecular weight. Particularly suitable molecular weights range from 200 to 100,000 and preferably from 500 to 25,000 and more preferably from 1000 to 20,000.

A wide variety of photoactive components may be used in the present invention, including, but not limited to, photoacid generators and photobase generators. Photoacid generators are preferred.

Photobase generators useful in the present invention are any compounds which liberate base upon exposure to light, typically at a wavelength of about 320 to 420 nanometers, however other wavelengths may be suitable. Suitable photobase generators include, but are not limited to: benzyl carbamates, benzoin carbamates, O-carbamoylhydroxyamines, O-carbamoyloximes, aromatic sulfonamides, alpha-lactams, N-(2-allylethenyl)amides, arylazide compounds, N-arylformamides, and 4-(ortho-nitrophenyl)dihydropyridines.

The photoacid generators useful in the present invention are any compounds which liberate acid upon exposure to light, typically at a wavelength of about 320 to 420 nanometers, however other wavelengths may be suitable. Suitable photoacid generators include, but are not limited to, halogenated triazines, onium salts, and sulfonated esters.

Particularly useful halogenated triazines include halomethyl-s-triazines. Suitable halogenated triazines include for example, 2-(1-(3,4-benzodioxolyl))-4,6-bis(trichloromethyl)-1,2,5-triazine, 2-(1-(2,3-benzodioxolyl))-4,6-bis(trichloromethyl)-1,3,5-triazine, 2-(1-(3,4-benzodioxolyl))-4,6-bis(tribromomethyl)-1,3,5-triazine, 2-(1-(2,3-benzodioxolyl))-4,6-bis(tribromomethyl)-1,3,5-triazine, 2-(2-furfylethylidene)-4,6-bis(trichloromethyl)-1,3,5-triazine, 2-(2-(5-methylfuryl)ethylidene)-4,6-bis(trichloromethyl)-1,3,5-triazine, 2-(2-(4-methylfuryl)ethylidene)-4,6-bis(trichloromethyl)-1,3,5-triazine, 2-(2-(3-methylfuryl)ethylidene)-4,6-bis-(trichloromethyl)-1,3,5-triazine, 2-(2-(4,5-dimethylfuryl)ethylidene)-4,6-bis(trichloromethyl)-1,3,5-triazine, 2-(2-(5-methoxyfuryl)ethylidene)-4,6-bis(trichloromethyl)-1,3,5-triazine, 2-(2-(4-methoxyfuryl)ethylidene)-4,6-bis(trichloromethyl)-1,3,5-triazine, 2-(2-(3-methoxyfuryl)ethylidene)-4,6-bis(trichloromethyl)-1,3,5-triazine, 2-(2-(4,5-dimethoxyfuryl)ethylidene)-4,6-bis(trichloromethyl)-1,3,5-triazine, 2-(2-furfylethylidene)-4,6-bis(tribromomethyl)-1,3,5-triazine, 2-(2-(5-methylfuryl)ethylidene)-4,6-bis(tribromomethyl) -1,3,5-triazine, 2-(2-(4-methylfuryl)-ethylidene)-4,6-bis(tribromomethyl)-1,3,5-triazine, 2-(2-(3-methylfuryl)ethylidene)-4,6-bis(tribromomethyl)-3,5-triazine, 2-(2-(4,5-dimethoxyfuryl)ethylidene)-4,6-bis(tribromomethyl)-1,3,5-triazine, 2-(2-(5-methoxyfuryl)ethylidene)-4,6-bis(tribromomethyl)1,3,5-triazine, 2-(2-(4-methoxyfuryl)ethylidene)-4,6-bis (tribromomethyl)-1,3,5-triazine, 2-(2-(3-methoxyfuryl)ethylidene)-4,6-bis(tribromomethyl)-1,3,5-triazine, 2-(2-(4,5-dimethoxyfuryl)ethylidene)-4,6-bis(tribromomethyl)-1,3,5-triazine, 2,4,6-tris-(trichloromethyl)-1,3,5-triazine, 2,4,6-tris-(tribromomethyl)-1,3,5-triazine, 2-phenyl-4,6-bis(trichloromethyl) -1,3,5-triazine, 2-phenyl-4,6-bis(tribromomethyl)-1,3,5-triazine, 2-(4-methoxyphenyl)-4,6-bis(trichloromethyl)-1,3,5-triazine, 2-(4-methoxyphenyl)-4,6-bis(tribromomethyl)-1,3,5-triazine, 2-(1-naphthyl)-4,6-bis(trichloromethyl)-1,3,5-triazine, 2-(1-naphthyl)-4,6-bis(tribromomethyl)-1,3,5-triazine, 2-(4-methoxy-1-naphthyl)-4,6-bis(trichloromethyl)-1,3,5-triazine, 2-(4-methoxy-1-naphthyl)-4,6-bis(tribromomethyl)-1,3,5-triazine, 2-(4-chlorophenyl)-4,6-bis(tribromomethyl) -1,3,5-triazine, 2-styryl-4,6-bis(trichloromethyl)-1,3,5-triazine, 2-styryl-4,6-bis(tribromomethyl) -1,3,5-triazine, 2-(4-methoxystyryl)-4,6-bis(trichloromethyl)-1,3,5-triazine, 2-(4-methoxystyryl) -4,6-bis(tribromomethyl)-1,3,5-triazine, 2-(3,4,5-trimethoxystyryl)-4,6-bis(trichloromethyl)-1,3,5-triazine, 2-(3,4,5-trimethoxystyryl)-4,6-bis(tribromomethyl)-1,3,5-triazine, 2-(3-chloro-1-phenyl)-4,6-bis(trichloromethyl)-1,3,5-triazine, 2-(3-chlorophenyl)-4,6-bis(tribromomethyl) - 1,3,5-triazine and the like. Other triazine type photoacid generators useful in the present invention are disclosed in U.S. Pat. No. 5,366,846, herein incorporated by reference.

The s-triazine compounds are condensation reaction products of certain methylhalomethyl-s-triazines and certain aldehydes or aldehyde derivatives. Such s-triazine compounds may be prepared according to the procedures disclosed in U.S. Pat. No. 3,954,475 and Wakabayashi et al., *Bulletin of the Chemical Society of Japan,* 42, 2924–30 (1969).

Onium salts with weakly nucleophilic anions are particularly suitable for use as photoacid generators in the present invention. Examples of such anions are the halogen complex anions of divalent to heptavalent metals or non-metals, for example, antimony, tin, iron, bismuth, aluminum, gallium, indium, titanium, zirconium, scandium, chromium, hafnium, copper, boron, phosphorus and arsenic. Examples of suitable onium salts include, but are not limited to: diaryldiazonium salts and onium salts of group VA and B, IIA and B and I of the Periodic Table, for example, halonium salts, quaternary ammonium, phosphonium and arsonium salts, aromatic sulfonium salts and sulfoxonium salts or selenium salts. Examples of suitable onium are disclosed in U.S. Pat. Nos. 4,442,197; 4,603,101; and 4,624,912, all incorporated herein by reference. Sulfonium salts such as triphenylsulfonium hexafluorophosphate are preferred.

The sulfonated esters useful as photoacid generators in the present invention include sulfonyloxy ketones. Suitable sulfonated esters include, but are not limited to: benzoin tosylate, t-butylphenyl alpha-(p-toluenesulfonyloxy)-acetate, and t-butyl alpha-(p-toluenesulfonyloxy)-acetate. Such sulfonated esters are disclosed in the *Journal of Photopolymer Science and Technology,* vol. 4, No. 3,337–340 (1991), incorporated herein by reference.

The amount of photoactive component useful in the present invention is any amount sufficient to catalyze cross-linking of the silsesquioxane oligomer. The photoactive components are typically used in the range of 0.1 to 25% by weight, based on the weight of the composition. It is preferred that the photoactive component is present in an amount in the range of 0.1 to 15% by weight, more preferably in the range of 0.1 to 12% by weight, and still more preferably less than or equal to 5% by weight. A particularly suitable range is from 0.1 to 5% by weight.

The compositions of the present invention may optionally contain one or more organic cross-linking agents. Any aromatic or aliphatic cross-linking agent that reacts with the silsesquioxane oligomer is suitable for use in the present invention. Such organic cross-linking agents will cure to form a polymerized network with the silsesquioxane oligomer, and reduce solubility in selected solvents. Such organic cross-linking agents may be monomers or polymers. It will be appreciated by those skilled in the art that combinations of cross-linking agents may be used successfully in the present invention.

Suitable organic cross-linking agents useful in the present invention include, but are not limited to: amine containing compounds, epoxy containing materials, compounds containing at least two vinyl ether groups, allyl substituted aromatic compounds, and combinations thereof. Preferred cross-linking agents include amine containing compounds and epoxy containing materials.

The amine containing compounds useful as cross-linking agents in the present invention include, but are not limited to: a melamine monomers, melamine polymers, alkylolmethyl melamines, benzoguanamine resins, benzoguanamine-formaldehyde resins, urea-formaldehyde resins, glycoluril-formaldehyde resins, and combinations thereof. These resins may be prepared by the reaction of acrylamide or methacrylamide copolymers with formaldehyde in an alcohol-containing solution, or alternatively by the copolymerization of N-alkoxymethylacrylamide or methacrylamide with other suitable monomers. Particularly suitable amine-based crosslinkers include the melamines manufactured by Cytec of West Paterson, N.J., such as CYMEL™ 300, 301, 303, 350, 370, 380, 1116 and 1130; benzoguanamine resins such as CYMEL™ 1123 and 1125; the glycoluril resins CYMEL™ 1170, 1171 and 1172; and the urea-based resins BEETLE™ 60, 65 and 80, also available from Cytec, West Paterson, N.J. A large number of similar amine-based compounds are commercially available from various suppliers.

Melamines are the preferred amine-based cross-linkers. Particularly preferred are alkylolmethyl melamine resins. These resins are typically ethers such as trialkylolmethyl melamine and hexaalkylolmethyl melamine. The alkyl group may have from 1 to 8 or more carbon atoms but is preferably methyl. Depending upon the reaction conditions and the concentration of formaldehyde, the methyl ethers may react with each other to form more complex units.

Epoxy containing materials useful as cross-linkers in the present invention are any organic compounds having one or more oxirane rings that are polymerizable by ring opening. Such materials, broadly called epoxides, include, but are not limited to: monomeric epoxy compounds, and polymeric epoxides that may be aliphatic, cycloaliphatic, aromatic or heterocyclic. Preferred epoxy cross-linking materials generally, on average, have at least 2 polymerizable epoxy groups per molecule. The polymeric epoxides include linear polymers having terminal epoxy groups (e.g., diglycidyl ether of a polyoxyalkylene glycol), polymers having skeletal oxirane units (e.g., polybutadiene polyepoxide), and polymers having pendant epoxy groups (e.g., glycidyl methacrylate polymer of copolymer). The epoxides may be pure compounds but are generally mixtures containing one, two or more epoxy groups per molecule.

Useful epoxy-containing materials may vary from low molecular weight monomeric materials and oligomers to relatively high molecular weight polymers and may vary greatly in the nature of their backbone and substituent groups. For example, the backbone may be of any type and substituent groups may be any group free of any substituents reactive with an oxirane ring at room temperature. Suitable substituents include, but are not limited to: halogens, ester groups, ethers, sulfonate groups, siloxane groups, nitro groups, phosphate groups, and the like.

Particularly useful epoxy containing materials in the present invention include glycidyl ethers. Examples are the glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)propane). Such glycidyl ethers include bisphenol A epoxides, such as bisphenol A ethoxylated diepoxide. Further examples of epoxides of this type are described in U.S. Pat. No. 3,018,262, herein incorporated herein by reference to the extent this patent teaches the preparation of such epoxides.

Suitable epoxides useful in the present invention include, but are not limited to: epichlorohydrin, glycidol, glycidylmethacrylate, the glycidyl ether of p-tertiarybutylphenol (e.g., those available under the trade name EPI-REZ 5014 from Celanese); diglycidyl ether of Bisphenol A (e.g., those available under the trade designations EPON 828, EPON 1004 and EPON 1010 from Shell Chemical Co.; and DER-331, DER-332 and DER-334 from Dow Chemical Co.), vinylcyclohexene dioxide (e.g., ERL-4206 from Union Carbide Corp.), 3,4-epoxy-6-methyl-cyclohexylmethyl-3,4-epoxy-6-methylcyclohexene carboxylate (e.g., ERL-4201 from Union Carbide Corp.), bis (3,4-epoxy-6-methylcyclohexylmethyl) adipate (e.g., ERL-4289 from Union Carbide Corp.), bis(2,3-epoxycyclopentyl) ether (e.g., ERL-0400 from Union Carbide Corp.), aliphatic epoxy modified with polypropylene glycol (e.g., ERL-4050 and ERL-4269 from Union Carbide Corp.), dipentene dioxide (e.g., ERL-4269 from Union Carbide Corp.), flame retardant epoxy resins (e.g., DER-580, a brominated bisphenol type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether (e.g., KOPOXITE from Koppers Company, Inc.).

Compounds containing at least two vinyl ether groups include, but are not limited to divinyl ethers of aliphatic, cycloaliphatic, aromatic or aralipathic diols. Examples of such materials include divinyl ethers of aliphatic diols having from 1 to 12 carbon atoms, polyethylene glycols, propylene glycols, polybutylene glycols, dimethylcyclohexanes, and the like. Particularly useful compounds having at least two vinyl ether groups include divinyl ethers of ethylene glycol, trimethylene-1,3-diol, diethylene glycol, triethylene glycol, dipropylene glycol, tripropylene glycol, resorcinol, Bisphenol A, and the like.

Suitable allyl substituted aromatic compounds useful as cross-linkers in the present invention are those containing one or more allyl substituents, that is, the aromatic compound is substituted at one or more ring positions by the allylic carbon of an alkylene group). Suitable allyl aromatics include allyl phenyl compounds, such as an allyl phenol. An allyl phenol crosslinker can be a monomer or polymer that contains one or more phenol units where the phenol units are substituted at one or more ring positions by an allylic carbon of an alkylene group. Typically the alkylene substituent(s) is propenyl, i.e., the phenol has one or more propenyl substituents. Preferred allyl phenols include a polycondensate of phenol and hydroxybenzaldehyde and an allylhalide such as allylchloride. A number of suitable allyl phenols are commercially available, for example the allyl phenol sold under the trade name THERMAX SH-150AR by Kennedy and Klim, Inc. (Little Silver, N.J.). Allyl phenyl compounds including allyl phenols are also described in U.S. Pat. No. 4,987,264, herein incorporated by reference to the extent this patent teaches the preparation of such compounds.

Particularly suitable organic cross-linking agents include those containing one or more methoxymethyl groups, such as methoxymethyl-substituted melamines and methoxymethyl-substituted glycourils. Hexamethoxymethylmelamine is a preferred methoxymethyl-substituted melamine. It is further preferred that one or more of the hydrogens of the organic cross-linking agent, and more preferably one or more of the methyl hydrogens in the methoxymethyl substituent, is substituted with a halogen, preferably fluorine. Thus, preferred cross-linkers include those containing one or more methoxyfluoromethyl and/or methoxydifluoromethyl substituents. Exemplary preferred fluorinated cross-linking agents include methoxyfluoromethyl- and methoxydifluoromethyl-substituted melamines and glycourils, such as hexamethoxy-fluoromethylmelamine and hexamethoxydifluoromethylmelamine. Also suitable are fluorinated epoxy cross-linking agents. For certain applications, it is preferred that the cross-linking agent is fluorinated.

The compositions of the present invention may suitably comprise only a single type of organic cross-linker, e.g., only an amine containing cross-linker, or may contain two or more different cross-linkers. When a combination of organic cross-linkers is used in the present invention, it is preferred that the combination include an amine containing compound and an epoxy containing compound. The concentration of organic cross-linking agents in the compositions of the present invention may vary within a relatively wide range. It will be appreciated by those skilled in the art that suitable organic cross-linker concentrations will vary with factors such as cross-linker reactivity and specific application of the composition. Typically, the cross-linking agent(s) is present in an amount in the range of 0.1 to 80% by weight, based on the total weight of the composition, preferably in the range of 0.5 to 50%, and more preferably in the range of 1 to 25%. It is preferred that a cross-linking agent is used in the compositions of the present invention.

Thus, the present invention further provides a photodefinable composition including a silsesquioxane oligomer including as polymerized units a monomer of the formula $(RSiO_{1.5})$ wherein R is selected from hydroxyphenyl or hydroxybenzyl; one or more organic cross-linking agents; and a photoactive component, wherein the solubility of the silsesquioxane oligomer is altered upon exposure to actinic radiation.

Other additives may optionally be present in the compositions of the invention include, but are not limited to: dyes, such as ORASOL BLUE, available from Ciba-Geigy, leveling agents, fillers, pigments, wetting agents, antifoam agents, adhesion promoters, thixotropic agents, fire retardants and the like. Such additives are well known in the art for coating compositions. It will be appreciated that more than one additive may be combined in the compositions of the present invention. For example, a wetting agent may be combined with a thixotropic agent. Suitable fillers and thixotropic agents include silica, famed silica, talc and the like. Suitable wetting agents include silicon based agents, such as SILWET™, available from Dow. Such optional additives are commercially available from a variety of sources. The amounts of such optional additives to be used in the present compositions are within the ability of those skilled in the art.

The present compositions may optionally contain one or more solvents. Such solvents aid in formulating the present compositions and in coating the present compositions on a substrate. A wide variety of solvents may be used. Suitable solvents include, but are not limited to, glycol ethers, such as ethylene glycol monomethyl ether, propylene glycol monomethyl ether, dipropylene glycol monomethyl ether; esters such asmethyl cellosolve acetate, ethyl cellosolve acetate, propylene glycol monomethyl ether acetate, dipropylene glycol monomethyl ether acetate, dibasic esters, carbonates such as propylene carbonate, γ-butyrolactone, esters such as ethyl lactate, n-amyl acetate and n-butyl acetate, alcohols such as n-propanol, iso-propanol, ketones such as cyclohexanone, methyl isobutyl ketone, diisobutyl ketone and 2-heptanone, lactones such as γ-butyrolactone and ε-caprolactone, ethers such as diphenyl ether and anisole, hydrocarbons such as mesitylene, toluene and xylene, and heterocyclic compounds such as N-methyl-2-pyrrolidone, N,N'-dimethylpropyleneurea, or mixtures thereof.

The photodefinable compositions of the present invention may be prepared by combining the silsesquioxane oligomer, photoactive component, optional solvent, optional one or more organic cross-linking agents and optional additives in any order.

The present photodefinable compositions are particularly suitable for use in the manufacture of optical waveguides. By "optical waveguide" is meant any device that transmits optical radiation across a two-dimensional substrate surface. Suitable optical waveguides include, but are not limited to, splitters, couplers, spectral filters, polarizers, isolators, wavelength division multiplexing structures, and the like. Such waveguides may also contain active functionality, such as amplification and switching such as with electro-optic, thermo-optic or acousto-optic devices. To be useful as amplifiers, the present waveguides typically contain one or more dopants. Erbium is an exemplary dopant. Such dopants are well known in the art. Thus, the present waveguides suitable for use as amplifiers contain one or more dopants.

The waveguides of the present invention may be manufactured as individual waveguides or as an array of waveguides. Whether such waveguides are prepared as an array depends on the particular use and is within the ability of one skilled in the art.

An advantage of the present invention is that waveguides may be prepared by directly imaging the present compositions. Thus, the present invention provides a method of manufacturing an optical waveguide including the steps of: a) depositing on a substrate a layer of a photodefinable composition including a silsesquioxane oligomer including as polymerized units a monomer of the formula $(RSiO_{1.5})$ wherein R is selected from hydroxyphenyl or hydroxyphenyl$(C_1-C_5)$alkyl; and a photoactive component; and b) exposing the composition to actinic radiation to form an optical waveguide. In an alternate embodiment, the present invention provides a method of manufacturing an optical waveguide including the steps of: a) depositing on a substrate a layer of a photodefinable composition including a silsesquioxane oligomer including as polymerized units a monomer of the formula $(RSiO_{1.5})$ wherein R is selected from hydroxyphenyl or hydroxybenzyl; one or more cross-linking agents; and a photoactive component; and b) exposing the composition to actinic radiation to form an optical waveguide.

The compositions of the invention are typically first disposed as a layer on a substrate by any means including, but not limited to, screen coating (or screen printing), curtain coating, roller coating, slot coating, spin coating, flood coating, electrostatic spray, spray coating, dip coating or as a dry film. When the compositions of the present invention are spray coated, a heated spray gun may optionally be used. The viscosity of the composition may be adjusted to meet the requirements for each method of application by viscosity modifiers, thixotropic agents, fillers and the like. Any substrate suitable for supporting a waveguide may be used with the present compositions. Suitable substrates include, but are not limited to, substrates used in the manufacture of electronic devices such as printed wiring boards and integrated circuits. Particularly suitable substrates include laminate surfaces and copper surfaces of copper clad boards, printed wiring board inner layers and outer layers, wafers used in the manufacture of integrated circuits, liquid crystal display ("LCD") glass substrates and the like.

The coated substrate is typically then cured, such as by baking, to remove any solvent. Such curing may be a variety of temperatures, depending upon the particular solvent chosen. Suitable temperatures are any that are sufficient to substantially remove any solvent present. Typically, the curing may be at any temperature from room temperature (i.e., 25° C.) to 170° C. Such curing typically occurs over a period of from 5 seconds to 30 minutes. Such curing may be affected by heating the substrate in an oven or on a hot plate.

After curing, the layer of the present composition disposed on the substrate is then imaged by exposure to actinic radiation through appropriate artwork or a mask. Following exposure, the composition is then cured at a temperature of from 40° to 170° C. Curing time may vary but is generally from about 30 seconds to about 1 hour. While not intending to be bound by theory, it is believed that upon exposure to actinic radiation the silsesquioxane oligomer cross-links, particularly with the optional cross-linking agent. The exposed areas are rendered less soluble than the unexposed areas. Thus, the unexposed areas may be removed, such as by contact with a suitable solvent, aqueous developer or solvent-water mixture, leaving only the exposed areas remaining on the substrate. Suitable aqueous developers include alkali metal hydroxides such as sodium hydroxide and potassium hydroxide in water as well as tetraalkylammonium hydroxide in water. Such developers are typically used in concentrations from 0.1 to 0.3 N, such as 0.15 to 0.26 N tetramethylammonium hydroxide in water. The choice of developer is well within the ability of those skilled in the art. Such development may be at a variety of temperatures such as from room temperature to about 100° C. The time of such development depends upon the material to be removed and the temperature used, but is generally from about 10 seconds to about 1 hour.

Following development, the present waveguides may undergo a final cure step, or re-flow step. In such final cure step, the waveguides may be heated at a temperature in from about 130° to 225° C. in air or inert atmospheres such as nitrogen or argon. Such final cure step aids in removal of residual solvent, removal of hydroxyl groups from the silsesquioxane polymer such as by increasing the extent of cross-linking, alter the waveguide profile such as to reduce surface roughness, and improves the optical transmission properties of the material.

Optical waveguides typically have a core and a cladding, wherein the cladding has a lower index of refraction as compared to the core. Particularly useful waveguides have core having an index of refraction of from 1.4 to 1.55. Typically, suitable cladding has an index of refraction of from 1.3 to 1.54.

With reference to FIG. 1, it is preferred that a cladding layer 1 is first deposited on a substrate 2. If the cladding layer is photocurable or thermocurable, it may be blanket cured as a first step. The photodefinable core material is then deposited on the cladding layer, imaged and the unexposed areas optionally removed. A second cladding layer 3 is then deposited on the imaged waveguide 4. The second cladding layer 3 may be the same or different from the first cladding layer 1. However, the indices of refraction of the first and second cladding layers should be the same. The second cladding layer is then cured, or imaged in the case of a photocurable cladding composition, to provide a waveguide structure.

The silsesquioxane oligomers and polymers of the present invention are suitable for use in the cladding and/or core of the present optical waveguides. Preferably, the present photodefinable compositions are used to prepare cores for optical waveguides. It will be appreciated that the refractive index of a photodefinable composition including a present silsesquioxane oligomer and one or more organic cross-linking agents may be modified by changing the amount and type of the one or more cross-linking agents selected and/or photoactive component. Thus, the present compositions may be useful as core or cladding material depending upon the type and quantity of cross-linking agents selected.

Optical waveguides of the present invention possess excellent transparencies at a variety of wavelengths. Thus, the present optical waveguides may be used at 0.83 to 0.85, 1.35 and 1.55 micron wavelengths. It will be appreciated that the present optical waveguides may be advantageously used at other wavelengths. If the hydroxyl content of the silsesquioxane polymer is high, the waveguide is preferably used at a wavelength of 0.83 to 0.85 microns. Thus, the present optical waveguides are particularly suited for use in telecommunications applications.

Thus, the present invention further provides an optical waveguide including a core and a cladding, wherein at least one of the core and cladding includes a silsesquioxane polymer including as polymerized units a monomer of the formula $(RSiO_{1.5})$ wherein R is selected from hydroxyphenyl or hydroxyphenyl($C_1$–$C_5$)alkyl. In another embodiment, the present invention provides an optical waveguide including a core and a cladding, wherein at least one of the core and cladding includes a silsesquioxane polymer including as polymerized units a monomer of the formula $(RSiO_{1.5})$ wherein R is selected from hydroxyphenyl or hydroxybenzyl; and one or more organic cross-linking agents.

The waveguides of the present invention may be used in a variety of applications, particularly in the manufacture of electronic devices 5, such as printed wiring boards, integrated circuits, interconnects, and the like. Thus, the present invention provides an electronic device including one or more waveguides including a core and a cladding, wherein at least one of the core and cladding includes as polymerized units a silsesquioxane oligomer of the formula $(RSiO_{1.5})_n$ wherein R is selected from hydroxyphenyl or hydroxyphenyl($C_1$–$C_5$)alkyl and n greater than zero. In yet another embodiment, the present invention provides an electronic device including one or more waveguides including a core and a cladding, wherein at least one of the core and cladding includes as polymerized units a silsesquioxane oligomer of the formula $(RSiO_{1.5})_n$ wherein R is selected from hydroxyphenyl or hydroxybenzyl and n is greater than zero; and a cross-linking agent.

The following examples are intended to illustrate further various aspects of the present invention, but are not intended to limit the scope of the invention in any aspect.

EXAMPLE 1

Into 21.0 parts of propylene glycol monomethyl ether acetate are added 10.5 parts of hydroxybenzylsilsesquioxane, 3.0 parts hexamethylolmethyl melamine as cross-linking agent, 1.0 part of triphenylsulfonium hexafluorophosphate as photoactive component, 0.06 parts siloxane wetting agent and 1.0 part of bisphenol A ethoxylated diepoxide.

The composition was spin coated to a thickness of 8 μm on a silicon oxide wafer. The solvent was removed by soft baking in an oven at 90° C. for 30 minutes. The composition was then exposed through a mask for 1000 mJ using a mercury halide lamp. The wafer was then baked at 100° C.

for 30 minutes. The wafer was then immersed in 0.26 N aqueous tetramethylammonium hydroxide at room temperature for 30 seconds. The wafer was then rinsed, dried and thermally cured at 150° C. for 1 hour to yield a waveguide structure. The refractive index of the waveguide was 1.5710+/−0.0002 at 1.550 micron.

EXAMPLE 2

A photodefinable composition was prepared by combining 10 parts of a silsesquioxane oligomer containing as polymerized units a 4-hydroxybenzylsilsesquioxane monomer and having a molecular weight of approximately 5000, 4 parts of a melamine cross-linking agent sold under the tradename CYMEL™ 303, 1 part triphenylsulfonium hexafluorophosphate and 28 parts ethyl lactate. The composition was spin coated on an untreated 6 in. (ca. 15 cm) silicon wafer at 420 rpm to provide a 0.3 mil thick coating. The coating was then exposed through a quartz glass phototool in a Tamarack collimated light source, photopolymer bulb with 365 nm output at 1000 mJ. Following exposure, the coating was baked at 90° C. for 30 minutes. After baking, the exposed coating was developed using 0.14 N aqueous sodium hydroxide, to provide an optical waveguide.

EXAMPLE 3

The procedure of Example 1 was repeated except that the amount of cross-linking agent was varied. The refractive index ("RI") of the samples at various wavelengths was determined. The results are reported in Table 1.

TABLE 1

| Cross-linking Agent (%) | RI (0.633 μm) | RI (0.78 μm) | RI (1.55 μm) |
| --- | --- | --- | --- |
| 1.7 | 1.5907 | 1.5823 | 1.5710 |
| 3.7 | 1.5912 | 1.5829 | 1.5712 |
| 7.1 | 1.5934 | 1.5849 | 1.5724 |
| 13.3 | 1.5959 | 1.5872 | 1.5745 |

The above data clearly show that as the amount of cross-linking agent in the present compositions increases the refractive index of the material also increases.

EXAMPLE 4

Example 1 was repeated except that the amount of photoactive component was varied. The refractive index ("RI") of the samples at various wavelengths was determined. The results are reported in Table 2.

TABLE 2

| Photoactive Component (%) | RI (0.633 μm) | RI (0.78 μm) | RI (1.55 μm) |
| --- | --- | --- | --- |
| 7.1 | 1.5934 | 1.5849 | 1.5724 |
| 13.3 | 1.5976 | 1.5889 | 1.5767 |

The above data clearly show that as the amount of photoactive component in the present compositions increases the refractive index of the material also increases.

What is claimed is:

1. A photodefinable composition comprising a silsesquioxane oligomer comprising polymerized units of the formula $(RSiO_{1.5})$ wherein R is selected from hydroxyphenyl or hydroxybenzyl; and a photoactive component, wherein the solubility of the silsesquioxane oligomer is altered upon exposure to actinic radiation.

2. The photodefinable composition of claim 1 wherein R is hydroxybenzyl.

3. The photodefinable composition of claim 1 wherein the photoactive component is selected from a photoacid generator and a photobase generator.

4. The photodefinable composition of claim 1 wherein the photoactive component comprises halogenated triazines, onium salts, or sulfonated esters.

5. The photodefinable composition of claim 1 further comprising one or more organic cross-linking agents.

6. The photodefinable composition of claim 5 wherein the one or more organic cross-linking agents comprise amine containing compounds, epoxy containing materials, compounds containing at least two vinyl ether groups or allyl substituted aromatic compounds.

7. The photodefinable composition of claim 6 wherein the one or more organic cross-linking agents comprise amine containing compounds or epoxy containing materials.

8. The photodefinable composition of claim 6 wherein the amine containing compounds comprise melamine monomers, melamine polymers, alkylolmethyl melamine resins, benzoguanamine resins, benzoguanamine-formaldehyde resins, urea-formaldehyde resins, glycoluril-formaldehyde resins, or combinations thereof.

9. The photodefinable composition of claim 5 wherein the one or more cross-linking agents contain one or more substituents selected from methoxyfluoromethyl or methoxydifluoromethyl.

10. The photodefinable composition of claim 1 wherein the silsesquioxane oligomer further comprises as polymerized units of the formula $(R^2SiO_{1.5})$, wherein $R^2$ is selected from hydroxyphenyl, hydroxyphenyl$(C_1-C_5)$alkyl, phenyl, halophenyl, $(C_1-C_{10})$alkylphenyl, $(C_1-C_{10})$fluoroalkylphenyl, $(C_1-C_{10})$alkyl and $(C_1-C_{10})$fluoroalkyl, wherein R and $R^2$ are not the same.

11. A method of manufacturing an optical waveguide comprising the steps of: a) depositing on a substrate a layer of a photodefinable composition comprising a silsesquioxane oligomer comprising as polymerized units a monomer of the formula $(RSiO_{1.5})$ wherein R is selected from hydroxyphenyl or hydroxyphenyl$(C_1-C_5)$alkyl; and a photoactive component; and b) exposing the composition to actinic radiation to form an optical waveguide.

12. The method of claim 11 wherein R is hydroxybenzyl or hydroxyphenylethyl.

13. The method of claim 11 wherein the silsesquioxane oligomer further comprises as polymerized units a monomer of the formula $(R^2SiO_{1.5})$, wherein $R^2$ is selected from hydroxyphenyl, hydroxyphenyl$(C_1-C_5)$alkyl, phenyl, halophenyl, $(C_1-C_{10})$alkylphenyl, $(C_1-C_{10})$fluoroalkylphenyl, $(C_1-C_{10})$alkyl and $(C_1-C_{10})$fluoroalkyl, wherein R and $R^2$ are not the same.

14. The method of claim 11 wherein the photodefinable composition further comprises one or more organic cross-linking agents.

15. The method of claim 14 wherein the one or more organic cross-linking agents comprise amine containing compounds, epoxy containing materials, compounds containing at least two vinyl ether groups or allyl substituted aromatic compounds.

16. The method of claim 15 wherein the one or more organic cross-linking agents comprise amine containing compounds or epoxy containing materials.

17. The method of claim 15 wherein the amine containing compounds comprise melamine monomers, melamine polymers, alkylolmethyl melamine resins, benzoguanamine resins, benzoguanamine-formaldehyde resins, urea-formaldehyde resins, glycoluril-formaldehyde resins, or combinations thereof.

18. The method of claim 14 wherein the one or more organic cross-linking agents contain one or more substituents selected from methoxyfluoromethyl or methoxydifluoromethyl.

19. The method of claim 11 wherein the photoactive component comprises halogenated triazines, onium salts, or sulfonated esters.

20. An optical waveguide comprising a core and a cladding, wherein at least one of the core and cladding comprises a silsesquioxane polymer comprising polymerized units of the formula ($RSiO_{1.5}$) wherein R is selected from hydroxyphenyl or hydroxyphenyl($C_1$–$C_5$)alkyl.

21. The optical waveguide of claim 20 wherein R is hydroxybenzyl or hydroxyphenylethyl.

22. The optical waveguide of claim 20 wherein the silsesquioxane polymer further comprises polymerized units of the formula ($R^2SiO_{1.5}$), wherein $R^2$ is selected from hydroxyphenyl, hydroxyphenyl($C_1$–$C_5$)alkyl, phenyl, halophenyl, ($C_1$–$C_{10}$)alkylphenyl, ($C_1$–$C_{10}$)fluoroalkylphenyl, ($C_1$–$C_{10}$)alkyl and ($C_1$–$C_{10}$)fluoroalkyl, wherein R and $R^2$ are not the same.

23. An electronic device comprising one or more waveguides of claim 20.

24. A photodefinable composition comprising a silsesquioxane oligomer comprising polymerized units of the formula ($RSiO_{1.5}$) wherein R is selected from hydroxyphenyl or hydroxybenzyl; one or more organic cross-linking agents; and a photoactive component, wherein the solubility of the silsesquioxane polymer is altered upon exposure to actinic radiation.

25. The photodefinable composition of claim 24 wherein the one or more organic cross-linking agents comprise amine containing compounds or epoxy containing materials.

26. The photodefinable composition of claim 25 wherein the amine containing compounds comprise melamine monomers, melamine polymers, alkylolmethyl melamine resins, benzoguanamine resins, benzoguanamine-formaldehyde resins, urea-formaldehyde resins, glycoluril-formaldehyde resins, or combinations thereof.

27. The photodefinable composition of claim 24 wherein the one or more organic cross-linking agents contain one or more substituents selected from methoxyfluoromethyl or methoxydifluoromethyl.

28. The photodefinable composition of claim 24 wherein the silsesquioxane oligomer further comprises a polymerized units of the formula ($R^2SiO_{1.5}$), wherein $R^2$ is selected from hydroxyphenyl, hydroxyphenyl($C_1$–$C_5$)alkyl, phenyl, halophenyl, ($C_1$–$C_{10}$)alkylphenyl, ($C_1$–$C_{10}$)fluoroalkylphenyl, ($C_1$–$C_{10}$)alkyl and ($C_1$–$C_{10}$)fluoroalkyl, wherein R and $R^2$ are not the same.

29. A method of manufacturing an optical waveguide comprising the steps of: a) depositing on a substrate a layer of the photodefinable composition of claim 24; and b) exposing the composition to actinic radiation to form an optical waveguide.

30. An optical waveguide comprising a core and a cladding, wherein at least one of the core and cladding comprises a silsesquioxane polymer comprising as polymerized units of the formula ($RSiO_{1.5}$) wherein R is selected from hydroxyphenyl or hydroxybenzyl; and one or more organic cross-linking agents.

31. The optical waveguide of claim 30 wherein the silsesquioxane polymer further comprises polymerized units of the formula ($R^2SiO_{1.5}$), wherein $R^2$ is selected from hydroxyphenyl, hydroxyphenyl($C_1$–$C_5$)alkyl, phenyl, halophenyl, ($C_1$–$C_{10}$)alkylphenyl, ($C_1$–$C_{10}$)fluoroalkylphenyl, ($C_1$–$C_{10}$)alkyl and ($C_1$–$C_{10}$)fluoroalkyl, wherein R and $R^2$ are not the same.

32. The optical waveguide of claim 30 wherein the one or more organic cross-linking agents comprise amine containing compounds, epoxy containing materials, compounds containing at least two vinyl ether groups or allyl substituted aromatic compounds.

33. The optical waveguide of claim 32 wherein the one or more organic cross-linking agents comprise amine containing compounds or epoxy containing materials.

34. The optical waveguide of claim 32 wherein the one or more organic cross-linking agents contain one or more substituents selected from methoxyfluoromethyl or methoxydifluoromethyl.

35. An electronic device comprising one or more optical waveguides of claim 30.

36. The optical waveguide of claim 30 further comprising one or more dopants.

37. The optical waveguide of claim 36 wherein the dopant is erbium.

* * * * *